(12) United States Patent
Reichert et al.

(10) Patent No.: US 10,066,509 B2
(45) Date of Patent: Sep. 4, 2018

(54) TURBOMACHINE PART COMPRISING A FLANGE WITH A DRAINAGE DEVICE

(71) Applicant: Snecma, Paris (FR)

(72) Inventors: Pamela Dominique Danièle Reichert, Saintry-sur-Seine (FR); Alain Marc Lucien Bromann, Vulaines sur Seine (FR); Kamel Benderradji, Livry sur Seine (FR); Alexandre Pierre François Leon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 274 days.

(21) Appl. No.: 14/674,593

(22) Filed: Mar. 31, 2015

(65) Prior Publication Data

US 2015/0275693 A1 Oct. 1, 2015

(30) Foreign Application Priority Data

Apr. 1, 2014 (FR) ...................................... 14 52871

(51) Int. Cl.
*F01D 25/24* (2006.01)
*F01D 25/32* (2006.01)
(Continued)

(52) U.S. Cl.
CPC ........... *F01D 25/243* (2013.01); *F01D 25/28* (2013.01); *F01D 25/32* (2013.01);
(Continued)

(58) Field of Classification Search
CPC ........ F01D 25/243; F01D 25/32; F16N 31/02; F05D 2260/6022; F05D 2240/14;
(Continued)

(56) References Cited

U.S. PATENT DOCUMENTS 2,462,493 A * 2/1949 Hamer .................... F16K 3/312
138/44
2,949,736 A * 8/1960 Rubbra ..................... F23R 3/60
60/39.094
(Continued)

FOREIGN PATENT DOCUMENTS

FR 2 934 640 A1 2/2010
WO 94/29598 A1 12/1994
WO 03/078799 A1 9/2003

OTHER PUBLICATIONS

Stephen L. Ross, M. Theodore Gresh, Robert M. Kranz; Compressor Seals for Hydrogen Recycle Service, 2002, Proceedings of the Thirty-First Turbomachinery Symposium.*
(Continued)

*Primary Examiner* — Gerald L Sung
*Assistant Examiner* — Stephanie Cheng
(74) *Attorney, Agent, or Firm* — Pearne & Gordon LLP

(57) ABSTRACT

The invention primarily relates to a turbomachine part (10) comprising a first upstream casing (2) and a second downstream casing (3), assembled to one another using at least one flange (6) formed by an upstream flange part (4) of the first upstream casing (2) and a downstream flange part (5) of the second downstream casing (3), the first upstream casing (2) and the second downstream casing (3) together at least partially delimiting the contour of an enclosure (30) in which at least one fluid (C) to be evacuated is contained, characterized in that it comprises a drainage device (1) comprising at least one drainage orifice (7a, 7b) formed on the flange (6) connecting the first upstream casing (2) and second downstream casing (3), in particular on the upstream flange part (4) of the flange (6), allowing the discharge of said at least one fluid (C) outside the enclosure (30).

14 Claims, 3 Drawing Sheets

(51) Int. Cl.
F04D 29/42 (2006.01)
F04D 29/52 (2006.01)
F01D 25/28 (2006.01)

(52) U.S. Cl.
CPC ....... F04D 29/4206 (2013.01); F04D 29/522 (2013.01); *F05D 2260/602* (2013.01); *Y02T 50/671* (2013.01)

(58) Field of Classification Search
CPC ......... F05D 2260/602; F05D 2260/605; F05D 2260/608; Y10T 137/3031; F16T 1/12; F16L 55/24; F02C 7/25; F02C 7/30; Y10S 165/371; Y10S 165/195; F05B 2260/602; F05B 2260/603; F05B 2260/64; B64C 1/1453
USPC ................ 60/39.094; 415/168.1; 244/129.2; 285/129.1–129.2
See application file for complete search history.

(56) References Cited

U.S. PATENT DOCUMENTS

| | | | | |
|---|---|---|---|---|
| 2,982,092 A * | 5/1961 | Keen | ........................ | F02C 7/232 181/215 |
| 3,371,482 A * | 3/1968 | Camboulives | .......... | F02C 7/232 60/39.094 |
| 4,463,774 A * | 8/1984 | Gorges | ................. | B64C 1/1453 137/238 |
| 4,506,851 A * | 3/1985 | Gupta | ................... | B64C 1/1453 137/244 |
| 5,082,367 A * | 1/1992 | Kohler | ................. | F16L 23/006 324/446 |
| 5,095,617 A * | 3/1992 | Costa | ..................... | F01M 13/00 29/513 |
| 5,197,766 A * | 3/1993 | Glover | ................. | F16L 23/167 210/165 |
| 5,285,636 A * | 2/1994 | Mayo | ........................ | F02C 7/00 244/129.1 |
| 5,312,137 A * | 5/1994 | Nee | ........................ | F16L 23/167 285/14 |
| 5,485,823 A * | 1/1996 | Lintott | ................... | F02M 57/02 123/506 |
| 5,489,124 A * | 2/1996 | Nee | ........................ | F16L 23/167 285/14 |
| 5,593,277 A * | 1/1997 | Proctor | ................... | F01D 11/18 415/115 |
| 5,957,503 A * | 9/1999 | Brown | ................. | F16L 23/003 285/13 |
| 6,000,278 A * | 12/1999 | Hystad | ................. | F16L 23/167 73/46 |
| 6,036,452 A * | 3/2000 | Huang | ................... | F04B 17/03 403/16 |
| 6,065,756 A * | 5/2000 | Eignor | .................. | F01D 11/005 277/545 |
| 7,107,662 B1 * | 9/2006 | Levario | ................. | F16L 23/125 277/608 |
| 7,526,921 B2 * | 5/2009 | Williams | ............... | B64D 41/00 244/54 |
| 8,459,941 B2 * | 6/2013 | Jasko | ...................... | F01D 9/041 285/122.1 |
| 8,882,443 B2 * | 11/2014 | Agneray | ............... | F04D 29/681 415/145 |
| 9,206,742 B2 * | 12/2015 | Chuong | .................. | F01D 25/12 |
| 2005/0056000 A1 * | 3/2005 | Jansen | .................... | F02C 7/232 60/39.094 |
| 2005/0189762 A1 * | 9/2005 | Endres | .................. | F16L 23/006 285/93 |
| 2005/0204746 A1 * | 9/2005 | Chereau | .................. | F01D 11/18 60/796 |
| 2008/0060362 A1 * | 3/2008 | Poccia | .................... | F01D 25/30 60/772 |
| 2008/0226445 A1 * | 9/2008 | Pommier | ................ | F01D 25/30 415/201 |
| 2009/0081037 A1 | 3/2009 | Audeon | | |
| 2009/0127848 A1 * | 5/2009 | Carns | .................... | F16L 23/003 285/55 |
| 2009/0188301 A1 * | 7/2009 | McConnell | ........... | G01M 3/223 73/40.7 |
| 2014/0003932 A1 * | 1/2014 | Knaack | ................. | F01D 25/162 415/213.1 |
| 2014/0174858 A1 * | 6/2014 | Remer | ...................... | F02C 7/06 184/106 |
| 2014/0182972 A1 * | 7/2014 | Hetherington | ........... | F02C 7/06 184/6.11 |
| 2014/0242896 A1 * | 8/2014 | Plessner | ................ | B64C 1/1453 454/71 |
| 2015/0010389 A1 * | 1/2015 | Busekros | ................ | F01D 25/26 415/134 |

OTHER PUBLICATIONS

US Department of Transportation Federal Aviation Administration, Advisory Circular: Engine Fire Protection 33.17, Aug. 8, 2009, US Department of Transportation, AC No. 33.17-1A, p. 5 & 9-10.*
William T Westfield of the Federal Aviation Administration, Ignition of Aircraft FLuids on High Temperature Engine Surfaces, Apr. 21-24, 1969, Society of Automotive Engineers and National Air Transportation Meeting in New York City, p. 69-71 & 81.*
U.S. Appl. No. 14/272,911, "Aircraft Turbofan Comprising an Intermediate Ring with Simplified Downstream Support" filed May 8, 2014.

* cited by examiner

--Prior Art--

TURBOMACHINE PART COMPRISING A FLANGE WITH A DRAINAGE DEVICE

TECHNICAL FIELD

The present invention relates to the field of turbomachines, and more particularly the general field of fluid drainage systems for turbomachines.

The invention applies to all types of land or aeronautic turbomachines, and in particular aircraft turbomachines such as turbojet engines and turboprops. More preferably, the invention may apply to a double body and dual flow turbojet engine.

It more specifically relates to a turbomachine part comprising a drainage device and a flange, as well as an associated turbomachine.

BACKGROUND OF THE INVENTION

In the field of turbomachines, and in particular aircraft turbomachines, it may prove necessary to provide means for discharging fluids of different natures, for example such as gas, oil or water, and in particular flammable fluid residues. Such a discharge of these fluids may for example be possible to prevent them from accumulating and disrupting the operation of the turbomachines. For example, some turbomachines require bleed operations that cause fluid losses that must be recovered and treated. Furthermore, such drainage is especially necessary in the case of flammable fluids so as to prevent a fire in the turbomachines.

Several solutions are already known to allow the discharge by drainage of fluids contained in a turbomachine enclosure. Preferably, the drainage of fluids is thus done at a low point of the turbomachine, in particular a low point of the enclosure. "Low point" refers to the point radially furthest from the axis of the turbomachine. To that end, the existing traditional solutions, to establish a bleed at a low point of a turbomachine enclosure, most often consist of forming drainage means on a casing of the enclosure, in particular by piercing and machining the casing to form one or more discharge orifices.

As an example, FIG. 1 diagrammatically and partially shows an example of the formation of drainage means 20a and 20b, at the low point of a line of casings of a high-pressure compressor 21 and a combustion chamber 22 of a turbomachine. In this FIG. 1, the high-pressure compressor 21 and the drainage means 20a and 20b have been very diagrammatically shown using blocks for simplification reasons.

The combustion chamber 22 comprises an annular flame tube 23, delimited by an inner shroud 24 and an outer shroud 25 concentric to the latter part, and comprising a chamber bottom 26 in the form of a plate passed through by the injectors 27 supplied by injection conduits 28. A compressor nozzle 29 provides the compressed air used for operation of the turbomachine by supplying a diffusion chamber 30 in which the flame tube 23 is submerged. Furthermore, as can be seen in this FIG. 1, the rear casing 2 of the high-pressure compressor 21 and the chamber casing 3 of the combustion chamber 22 are assembled to one another, by upstream 4 and downstream 5 flange parts, respectively.

In order to ensure the discharge of any fluid residues located in the enclosure formed by the rear casing 2 of the high-pressure compressor 21 and the chamber casing 3 of the combustion chamber 22, drainage means 20a and/or 20b can respectively be provided on the rear casing 2 of the high-pressure compressor 21 and on the chamber casing 3 of the combustion chamber 22. These drainage means 20a, 20b must preferably be formed at the low point of the line of casings formed by the rear casing 2 and the chamber casing 3 to facilitate the drainage, in other words, in a lowest region of the line of casings, i.e., also at the point radially furthest from the axis T of the turbomachine. It is thus provided to pierce and machine the rear casing 2 to form the drainage means 20a, and to pierce and machine the chamber casing 3 to form the drainage means 20b.

Nevertheless, the solutions of the prior art are not fully satisfactory and have several drawbacks. In fact, the formation of the drainage means on the casings of the turbomachine may have a substantial negative impact on the performance of the turbomachine. In particular, it may prove difficult to truly form drainage zones at the low point of the line of casings, which prevents obtaining optimal drainage of the fluids. Furthermore, being positioned on the casings of the turbomachine causes many constraints in producing the drainage means, and in particular in terms of mass increase, decreased lifetime of the parts, and machining difficulties to form the drainage orifices.

BRIEF DESCRIPTION OF THE INVENTION

There is therefore a need to propose an alternative solution for a fluid drainage device for a turbomachine that is easier to implement and more reliable, while providing effective fluid drainage.

The invention aims to at least partially resolve the aforementioned needs and drawbacks relative to the embodiments of the prior art.

According to one aspect, the invention thus relates to a turbomachine part comprising a first upstream casing and a second downstream casing, assembled to one another using at least one flange formed by an upstream flange part of the first upstream casing and a downstream flange part of the second downstream casing, the first upstream casing and the second downstream casing together at least partially delimiting the contour of the enclosure in which at least one fluid to be evacuated is contained, characterized in that it comprises a drainage device comprising at least one drainage orifice formed on the flange connecting the first upstream casing and second downstream casing, in particular on the upstream flange part of the flange, allowing the discharge of said at least one fluid outside the enclosure.

Owing to the invention, it may be possible to minimize the changes made to the turbomachine to place the drainage means for fluids to be discharged. Advantageously, the invention procures mass savings relative to the solutions previously described, and does not impose the constraints related to the machining of casings of the turbomachine to form drainage orifices, as according to the solutions of the prior art. The invention further allows an advantageous use of flanges connecting the turbomachine casings to achieve effective drainage of the fluids to be discharged, those flanges being particularly situated at the low point of the turbomachine. In this way, the invention makes it possible to ensure the discharge of the fluid residues without having a significant impact on the overall performance of the turbomachine.

The turbomachine part according to the invention may further comprise one or more of the following characteristics, considered alone or according to any technically possible combination(s).

The drainage orifice(s) of the drainage device are advantageously through orifices, so as to allow the circulation of the fluid(s) to be discharged.

Furthermore, preferably, the turbomachine part according to the invention may be a stator turbomachine part. Also preferably, the turbomachine part according to the invention may be a turbomachine compressor part, in particular a high-pressure compressor part. In particular, the turbomachine part according to the invention may be a turbomachine high-pressure compressor stator part.

The flange connecting the first upstream casing and the second downstream casing, at which the drainage device is formed, may constitute a low point of the line of casings formed by the first upstream casing and second downstream casing. As previously indicated, "low point" means that the flange may constitute the point of the line of casings formed by the first upstream casing and the second downstream casing that is radially furthest from the axis of the turbomachine.

The drainage device may comprise at least one first drainage orifice, to allow the passage of said at least one fluid within the drainage device from the enclosure, and a second drainage device, to allow the discharge of said at least one fluid. The first and second drainage orifices may be formed, in particular by machining, on a flange part of the flange, in particular the upstream flange part, between two consecutive fastening orifices for screws of the flange.

The first and second drainage orifices may be radially superimposed relative to one another.

The first drainage orifice can be formed through the flange part in an oblique direction relative to an axial direction, in other words, relative to the axis of rotation of the turbomachine. In particular, the first drainage orifice may comprise an end emerging on the outer surface of one of the casings, in particular the first upstream casing.

However, the second drainage orifice may be formed through the flange part in an axial direction, in other words, along the axis of rotation of the turbomachine.

The first and second drainage orifices may have a substantially cylindrical shape, the first drainage orifice in particular having a diameter smaller than that of the second drainage orifice.

The direction in which the first drainage orifice extends can form an angle with a radial direction comprised between 45 and 75°, preferably between 55 and 65°. In this way, it may be possible to avoid making the flange more fragile, in particular the upstream flange part, in particular near the curve radii.

The first and second drainage orifices may further be formed through the flange part substantially midway on the distance between the two consecutive fastening orifices for the screws of the flange. In this way, it may be possible to avoid overloading the stresses on one of the two fastening orifices. It is thus possible to obtain an equivalent distribution of the stresses on each of the two consecutive fastening orifices.

Furthermore, advantageously, the second drainage orifice and the two consecutive fastening orifices of the screws of the flange may be made on a same radius of the flange, i.e., they may be situated at identical distances relative to the outer periphery of the flange. In this way, it may be possible to facilitate the production of the flange, in particular the flange part comprising the drainage orifice, and in particular to facilitate the machining operations.

The drainage device may comprise a basin formed, in particular by machining, on the flange part of the flange, in particular the upstream flange part, between two consecutive orifices for fastening screws of the flange, the first and second drainage orifices being formed through the basin.

The basin is advantageously not a through basin. The basin may have any type of shape, and in particular a substantially oblong shape in radial section.

The first drainage orifice may comprise a first through end on the outer surface of the flange part and a second through end on the basin.

Likewise, the second drainage orifice may comprise a first through end on the basin and a second through end on the surface of the flange part opposite the basin.

Preferably, the axial depth of the basin, i.e., the thickness of the basin measured in an axial direction, is comprised between $1/8$ and $1/3$ of the axial thickness (i.e., measured in an axial direction) of the flange part on which the basin is formed.

In fact, if the axial depth of the basin is less than $1/8$ of the axial thickness of the flange part, there is a risk of not providing the necessary flow rate for the discharge of fluid(s). Likewise, if the axial depth of the basin exceeds $1/3$ of the axial thickness of the flange part, there is a risk of making the flange part more fragile.

Furthermore, the radial height of the basin, i.e., the length of the basin measured in a radial direction, in other words perpendicular to the axis of rotation of the turbomachine, may be comprised between $1/2$ and $3/4$ of the radial height of the flange part measured on the surface provided with the basin from the inner surface of the flange part. The radial height of the flange part may particularly be determined as a function of the position of the second drainage orifice, in particular in order to facilitate the machining of the flange part.

The drainage device may comprise a drainage connector, a first end of which is fastened on the flange connecting the first upstream casing and the second downstream casing, in particular on the upstream flange part of the flange, in particular through screws of the flange, so as to ensure fluid communication between the drainage connector and said at least one drainage orifice of the drainage device, and a second end of which is designed to be connected to a drainage channel to discharge said at least one fluid, with which the drainage connector is in fluid communication.

The drainage connector may for example have a generally bent shape.

At its first end, the drainage connector may comprise two mounting orifices through which two successive screws of the flange can be inserted, between which said at least one drainage orifice of the drainage device is formed, so as to allow the fastening of the drainage connector on the flange, and in particular on the upstream flange part.

The drainage connector may comprise a valve, in particular a flap gate, controlled so as to allow or prohibit the passage of said at least one fluid through the drainage device so that it may be discharged outside the enclosure.

The valve may for example be controlled electrically and/or mechanically and/or by a pressurized fluid to allow its operation.

The valve member may in particular be situated across from the second drainage orifice of the drainage device.

The valve may be open when the pressure difference between the pressure in the enclosure and the pressure outside the enclosure, i.e., the pressure difference between the outer and inner zones of the line of casings formed by the first upstream casing and second downstream casing, is below a predetermined pressure threshold.

The valve thus makes it possible to control the circulation of the drained fluid(s) in the drainage device. This allows precise control of the discharge moment of the drained fluids, so that they are not for example discharged upon ignition of the turbomachine.

Furthermore, the diameter of the first drainage orifice, preferably with a substantially cylindrical shape, may for example be comprised, non-limitingly, between 1 and 3 mm.

Likewise, the diameter of the second drainage orifice, preferably substantially cylindrical, may for example be comprised, non-limitingly, between 1 and 5 mm, more preferably still between 2 and 4 mm. The diameter of the second drainage orifice may for example be determined to ensure potential good integration with the valve of the drainage connector.

According to another of its aspects, the invention also relates to a turbomachine compressor, in particular a high-pressure compressor, characterized in that it comprises a turbomachine part as previously defined.

According to another of its aspects, the invention also relates to a turbomachine, characterized in that it comprises a turbomachine part as previously defined or a compressor as previously defined.

The turbomachine may comprise, from upstream to downstream, a compressor, in particular a high-pressure compressor, and a combustion chamber. The first upstream casing and second downstream casing may respectively constitute a rear casing of the compressor and a chamber casing of the combustion chamber forming a line of casings at least partially delimiting the contour of an enclosure of the combustion chamber, in particular a diffusion chamber, containing at least one fluid to be discharged, in particular fuel.

BRIEF DESCRIPTION OF THE DRAWING

The invention may be better understood upon reading the following detailed description of one non-limiting example embodiment thereof, as well as examining the partial and diagrammatic figures of the appended drawing, in which.

In all of these figures, identical references may designate identical or similar elements.

Furthermore, the different parts shown in the figures are not necessarily shown using a uniform scale, to make the figures more legible.

DETAILED DESCRIPTION OF THE INVENTION

Throughout the description, it is noted that the terms "upstream" and "downstream" should be considered relative to a main normal flow direction F of the gases (from upstream to downstream) for a turbomachine. Furthermore, the axis of the turbomachine refers to the radial axis of symmetry of the turbomachine. The axial direction of the turbomachine corresponds to the direction of the axis T of the turbomachine. A radial direction of the turbomachine is a direction perpendicular to the axis T of the turbomachine. Furthermore, unless otherwise specified, the adjectives and adverbs "axial", "radial", "axially" and "radially" are used in reference to the aforementioned axial and radial directions. Furthermore, unless otherwise specified, the terms "inner" and "outer" are used in reference to a radial direction, such that the inner part of an element is closer to the axis T of the turbomachine than the outer part of the same element.

Figure 1:
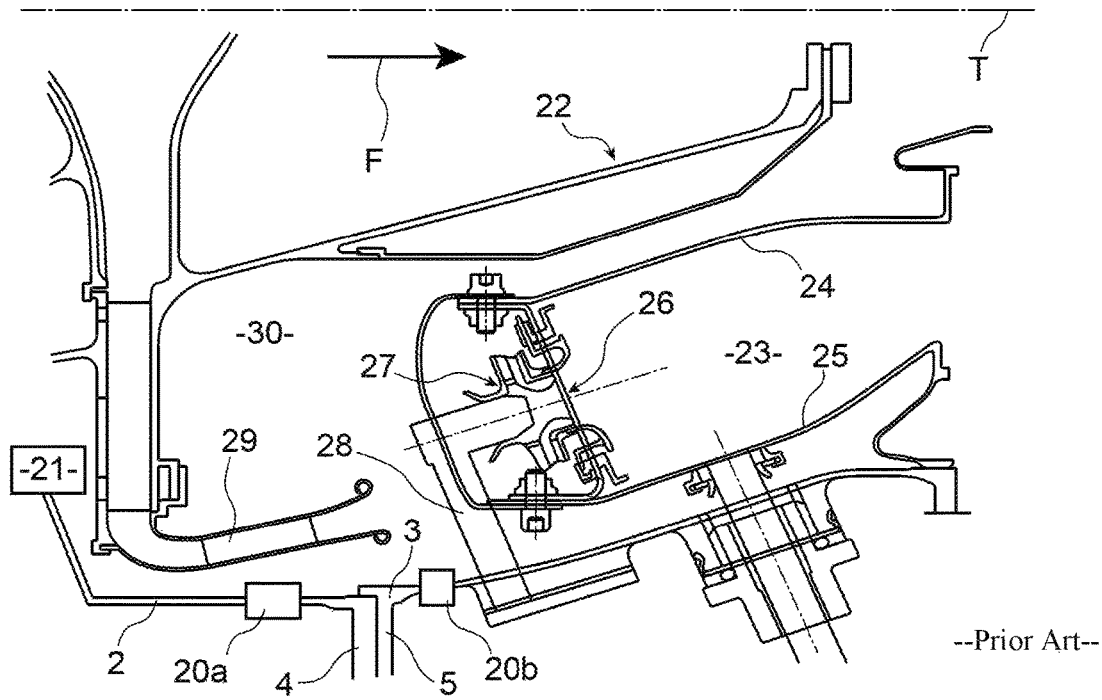
FIG. 1 shows an axial sectional view of an example of the formation of fluid drainage means according to the prior art, on a line of casings of a high-pressure compressor and a combustion chamber of a turbomachine.

FIG. 1 has already been described above with regard to the part relative to the prior state of the art.

In reference to FIGS. 2 to 5, we will now describe one example embodiment of a turbomachine part 10 according to the invention, comprising a drainage device 1 formed at flange 6.

Figure 2:
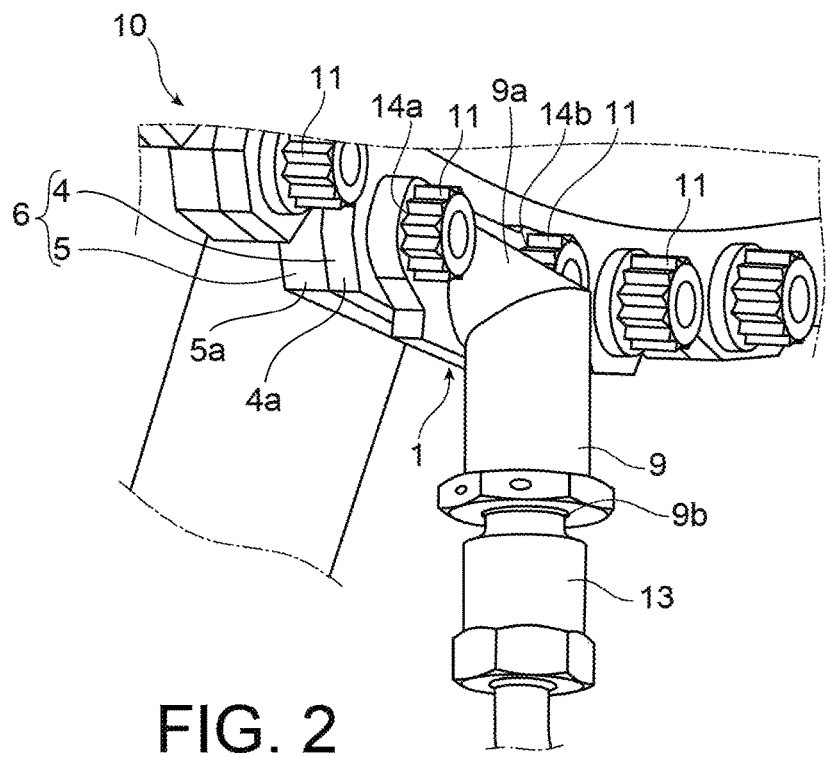
FIG. 2 shows a partial perspective view of an example turbomachine part according to the invention comprising a drainage device formed on a flange comprising casing flange parts of a high-pressure compressor and a combustion chamber of a turbomachine.

More specifically, FIG. 2 shows, in a partial perspective view, the turbomachine part 10 comprising the flange 6 provided with the drainage device 1.

Figure 3:
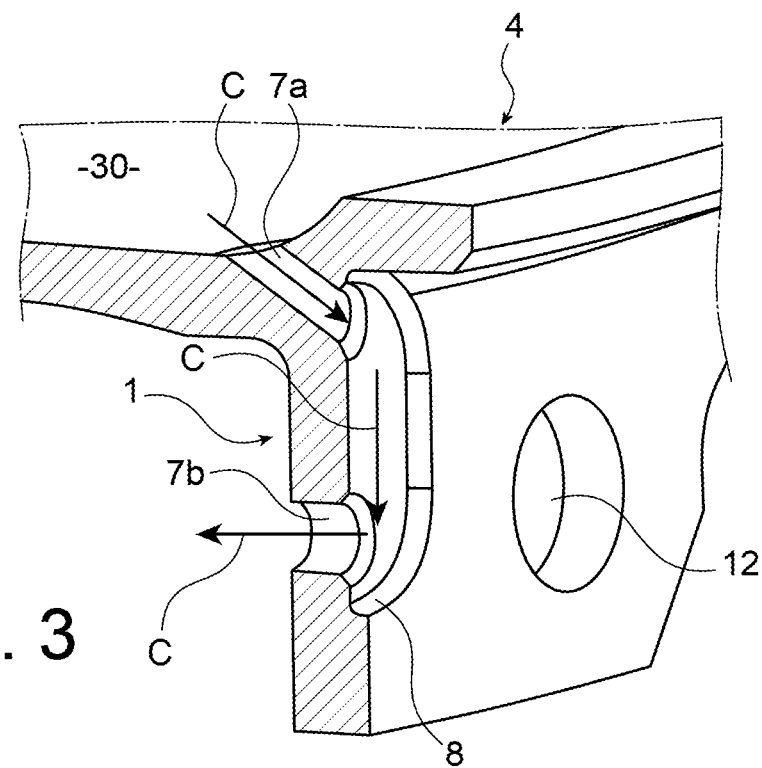
FIG. 3 shows a partial axial sectional perspective view of a detail of an embodiment of the drainage device on the upstream flange part of the flange of FIG. 2.
Figure 4:
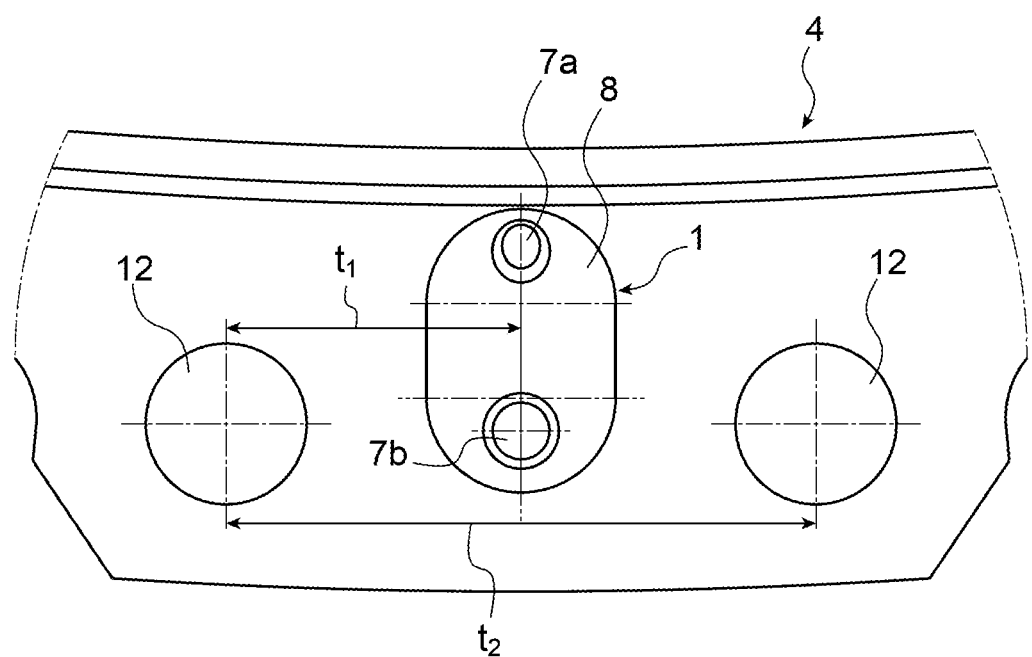
FIG. 4 shows, partially in radial section, the upstream flange part of the flange of FIG. 2 at the drainage device.
Figure 5:
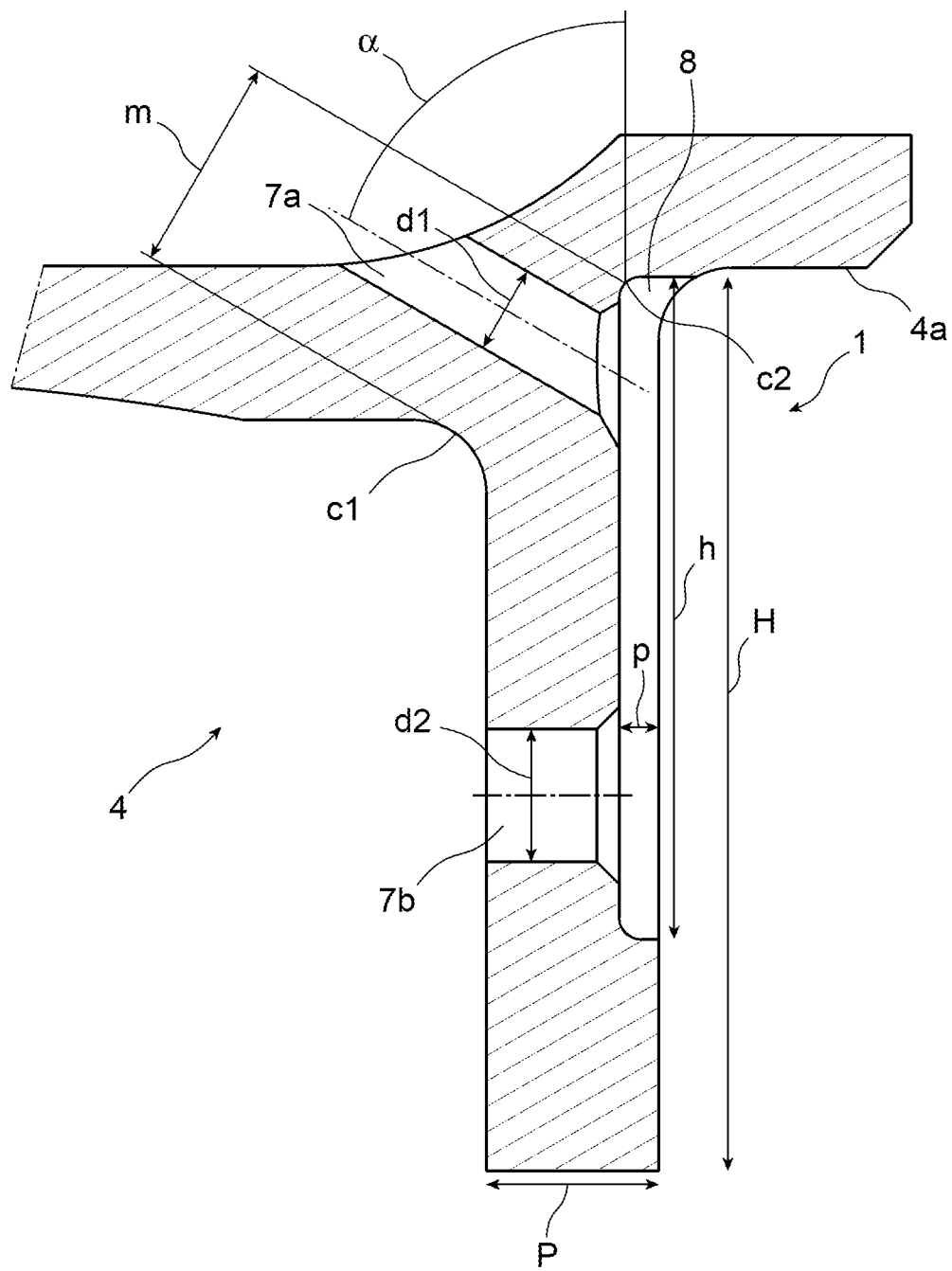
FIG. 5 shows, partially in axial section, the upstream flange part of the flange of FIG. 2 at the drainage device.

FIGS. 3, 4 and 5 show, in axial sectional perspective view, radial sectional view and axial sectional view, respectively, the upstream flange part 4 of the flange 6 of FIG. 2 at the drainage device 1.

In the example embodiment of the turbomachine part 10 described below, it is considered that the turbomachine part 10 is a stator part of a high-pressure compressor 21, this turbomachine part 10 thus comprising a first upstream casing 2 and a second downstream casing 3 together forming a line of casings of the high-pressure compressor 21 and a combustion chamber 22, similarly to what has been previously described in reference to FIG. 1. In particular, the first upstream casing 2 constitutes a rear casing 2 of the high-pressure compressor 21, and the second downstream casing 3 constitutes a chamber casing 3 of the combustion chamber 22. In this way, the elements of the turbomachine part 10 already described above in reference to FIG. 1 are not covered again below. Of course, this choice is in no way limiting, and the turbomachine part 10 could be different from a part situated at a high-pressure compressor 21 and a combustion chamber 22.

As described in reference to FIG. 1, the first upstream casing 2 comprises an upstream flange part 4 and the second downstream casing 3 comprises a downstream flange part 5. As shown in FIG. 2, the upstream flange part 4 comprises a first member 4a and the downstream flange part 5 comprises a second member 5a that both extend in a direction transverse (e.g., perpendicular) to the axis T of the turbomachine, the upstream and downstream flange parts 4, 5 forming the flange 6. That FIG. 2 also shows the drainage device 1 making it possible to discharge one or more fluids contained in the enclosure 30 (see FIG. 1) outside the enclosure 30, so as to ensure the drainage, required in some cases, of the residual fluid(s). Furthermore, the screws 11 of the flange 6 are also shown.

Advantageously, placing the drainage device 1 directly at the flange 6 can make it possible to form the drainage for the fluid(s) to be discharged from the low point of the line of casings formed by the first upstream casing 2 and second downstream casing 3, without creating the constraints previously described relative to the solutions of the prior art.

As can be seen in FIGS. 3, 4 and 5, the drainage device 1, formed on the upstream flange part 4 of the flange 6, comprises a first drainage orifice 7a, to allow the passage of the fluid C within the drainage device 1 from the enclosure 30, and a second drainage orifice 7b, to allow the discharge of fluid C outside the enclosure 30. In this way, the first 7a and second 7b drainage orifices are through orifices.

Furthermore, as can be seen in particular in FIG. 4, first 7a and second 7b drainage orifices are formed on the upstream flange part 4 between two consecutive fastening orifices 12 for the screws 11 of the flange 6. Furthermore, these first 7a and second 7b drainage orifices are in particular radially superimposed relative to one another.

Furthermore, as can be seen in FIGS. 3, 4 and 5, the drainage device 1 further comprises a basin 8 formed on the upstream flange part 4 between two consecutive fastening orifices 12 of the screws 11 of the flange 6. The first 7a and second 7b drainage orifices are formed through that basin 8.

The basin 8 is advantageously not a through basin and for example has, in radial section, a substantially oblong shape.

Furthermore, the drainage device 1 also comprises a drainage connector 9, shown in FIG. 2, a first end 9a of which is fastened on the upstream side part 4 by screws 11 of the flange 6, so as to be able to provide fluid communication between the drainage connector 9 and the second drainage orifice 7b of the drainage device 1, and whereof the second end 9b of the drainage connector 9 is connected to a drainage channel 13 that makes it possible to discharge the fluid(s) C to be drained, the second end 9b being in fluid communication with the drainage channel 13.

The drainage connector 9 can, as shown in FIG. 2, have a generally bent shape. Furthermore, the drainage connector 9 comprises, at its first end 9a, two mounting orifices 14a and 14b through which two successive screws 11 of the flange 6 are inserted, such that the drainage connector 9 is fastened to the upstream flange part 4.

Advantageously, although not shown, the drainage connector 9 also comprises a valve, in particular a flap gate, that is controlled so as to allow or prohibit the passage of the fluid(s) C from the drainage device 1 so that they may be discharged outside the enclosure 30.

In particular, the flap gate may be formed at the second drainage orifice 7b of the drainage device 1.

The opening and closing of the flap gate may be controlled in different ways. In particular, in order to limit the performance losses during normal operation of the turbomachine part 10, the flap gate may be opened when the pressure difference between the pressure in the enclosure 30 and the pressure outside the enclosure 30, in other words, the pressure difference between the outer and inner zones at the line of casings formed by the first upstream casing 2 and second upstream casing 3, is below a predetermined pressure threshold. In this way, the valve may make it possible to precisely control the discharge moment of the drained fluids so that they are not discharged in certain operating scenarios of the turbomachine.

Furthermore, as can be seen in particular in FIGS. 3 and 5, the first drainage orifice 7a can be formed through the upstream flange part 4 in an oblique direction relative to an axial direction. In particular, as shown in FIG. 5, the direction in which the first drainage orifice 7a extends forms an angle α with a radial direction is for example comprised between 45 and 75°, and more preferably between 55 and 65°. This value of the angle a may be chosen so as to avoid making the flange 6 more fragile, and in particular the upstream flange part 4, in particular near the curve radii.

The second drainage orifice 7b may be formed through the upstream flange part 4 in an axial direction, as can be seen in FIGS. 3 and 5.

The first 7a and second 7b drainage orifices may preferably have a substantially cylindrical shape, the first drainage orifice 7a having a diameter d1 smaller than the diameter d2 of the second drainage orifice 7b.

In particular, as shown in FIG. 5, the diameter d1 of the first drainage orifice 7a may for example be substantially equal to m/3, where m represents the distance between the upstream inner bend c1 of the upstream flange part 4 and the downstream inner bend c2 of the upstream flange part 4. This diameter d1 of the first drainage orifice 7a may for example be comprised between 1 and 3 mm.

Likewise, the diameter d2 of the second drainage orifice 7b may be substantially comprised between 1 and 5 mm, and more preferably between 2 and 4 mm. In any case, the diameter d2 of the second drainage orifice 7b may be determined so as to be able to ensure good integration of the flap gate equipping the drainage connector 9, that flap gate being able in particular to be a standard manufactured part.

Furthermore, as shown in FIG. 4, the first 7a and second 7b drainage orifices are preferably formed through the upstream flange 4 substantially halfway over the distance between two consecutive fastening orifices 12 of the screws 11 of the flange 6. In other words, the distance $t_1$ between the first 7a and second 7b drainage orifices and an adjacent fastening orifice 12 is equal to half of the distance $t_2$ between the two consecutive fastening orifices 12. In this way, it may be possible to avoid overloading the stresses on a single one of the two fastening orifices 12. Advantageously, an equivalent distribution is obtained at the stresses on each of the two consecutive fastening orifices 12.

Furthermore, as also shown in this FIG. 4, the second drainage orifice 7b and the two fastening orifices 12 that are situated on either side thereof are advantageously formed on a same radius of the upstream flange part 4, in other words at a same distance from the inner or outer periphery of the upstream flange part 4, such that the machining operations of the upstream flange part 4 can be made easier.

Furthermore, as shown in FIG. 5, the axial depth p of the basin 8, i.e., the depth of the basin 8 measured in an axial direction, is comprised between ⅛ and ⅓ of the axial thickness P of the upstream flange part 4. In fact, if p is less than P/8, then there is a risk of not providing the necessary flow rate for the discharge of the fluid(s) C. Likewise, if p is greater than P/3, then there is a risk of making the flange 6 more fragile, and more particularly the upstream flange part 4.

Furthermore, the radial height h of the basin 8, i.e., the length of the basin 8 measured in a radial direction, may be comprised between ½ and ¼ of the radial height H of the upstream flange part 4 measured on the surface provided with basin 8 from the inner surface 4a of the upstream flange part 4. This radial height H of the flange part may more particularly be determined as a function of the position of the second drainage orifice 7b, so as to facilitate the machining of the upstream flange part 4.

Advantageously, the piercing and machining of the basin 8 and the first 7a and second 7b drainage orifices of the drainage device 1 formed on the upstream flange part 4 of the flange 6 may be made in a simpler and optimal manner without increasing the mass and machining constraints related to the solutions of the prior art.

Furthermore, generally, the dimensioning of the first 7a and second 7b drainage orifices in the basin 8 formed on the upstream flange part 4 may be determined as a function of the flow rate of the fluid(s) C designed to be discharged through the drainage device 1, and also as a function of the thermal stresses applied to the upstream flange part 4.

Thus, the invention makes it possible to propose an alternative solution to the solutions already known to produce fluid drainage for fluids to be discharged in a turbomachine, the drainage here being done in an optimized manner owing to the use of the flange 6 located on the low point of the line of casings of the high-pressure compressor 21 and the combustion chamber 22.

Of course, the invention is not limited to the example embodiment described above. Various changes may be made by one skilled in the art.

The expression "comprising a" must be understood as being synonymous with "comprising at least one", unless otherwise specified.

What is claimed is:

1. A turbomachine part comprising
   a first upstream casing and a second downstream casing, assembled to one another using at least one flange formed by an upstream flange part of the first upstream casing and a downstream flange part of the second downstream casing, the first upstream casing and the second downstream casing together at least partially delimiting the contour of an enclosure in which at least one fluid to be evacuated is contained, wherein the first upstream casing is a casing of a compressor and the second downstream casing is a casing of a combustion chamber;
   wherein the turbomachine part comprises a drainage device comprising at least one drainage orifice formed on the at least one flange connecting the first upstream casing and second downstream casing allowing the discharge of said at least one fluid outside the enclosure,
   wherein the upstream flange part comprises a first member and the downstream flange part comprises a second member, the first member and the second member both extending in a direction transverse to an axis of the turbomachine and being connected to each other with at least one fastener extending through the first member and second member,
   and wherein the at least one drainage orifice comprises a first drainage orifice and a second drainage orifice,
   wherein the first drainage orifice extends through one of the upstream flange part and downstream flange part in a direction that is oblique to the axis of the turbomachine to allow the passage of said at least one fluid within the drainage device from the enclosure,
   the second drainage orifice allows the discharge of said at least one fluid,
   and both the first drainage orifice and second drainage orifice are formed on the at least one flange between two consecutive fastening orifices for screws of the at least one flange.

2. The turbomachine part according to claim 1, wherein the at least one flange connecting the first upstream casing and the second downstream casing, at which the drainage device is formed, constitutes a low point of a line of casings formed by the first upstream casing and second downstream casing.

3. The turbomachine part according to claim 1, wherein the drainage device comprises a basin formed on the at least one flange between the two consecutive fastening orifices, the first drainage orifice and second drainage orifice being formed through the basin.

4. The turbomachine part according to claim 1, wherein the drainage device comprises a drainage connector, a first end of which is fastened on the at least one flange connecting the first upstream casing and second downstream casing so as to ensure fluid communication between the drainage connector and said at least one drainage orifice of the drainage device, and a second end of which is designed to be connected to a drainage channel to discharge said at least one fluid, with which the drainage connector is in fluid communication.

5. The turbomachine part according to claim 4, wherein the drainage connector comprises a valve controlled so as to allow or prohibit the passage of said at least one fluid through the drainage device so that it may be discharged outside the enclosure.

6. The turbomachine part according to claim 5, wherein the valve is open when the pressure difference between a pressure in the enclosure and a pressure outside the enclosure is below a predetermined pressure threshold.

7. The turbomachine part according to claim 1, wherein it is a turbomachine high-pressure compressor stator part.

8. A turbomachine comprising a turbomachine part according to claim 1.

9. The turbomachine according to claim 8, comprising, from upstream to downstream, a compressor and a combustion chamber wherein the first upstream casing and second downstream casing respectively constitute a rear casing of the compressor and a chamber casing of the combustion chamber forming a line of casings at least partially delimiting the contour of an enclosure of the combustion chamber containing at least one fluid to be discharged.

10. The turbomachine part according to claim 1, wherein the first drainage orifice is integrally formed on one of the first member and the second member.

11. The turbomachine part according to claim 1, wherein the first member and the second member both extend in a direction perpendicular to the axis of the turbomachine.

12. The turbomachine part according to claim 1, wherein the second drainage orifice extends through the same one of the upstream flange part and downstream flange part that the first drainage orifice extends through.

13. The turbomachine part according to claim 12, wherein the second drainage orifice extends parallel to the axis of the turbomachine.

14. The turbomachine part according to claim 12, wherein the at least one drainage orifice further comprises a basin defined by the same one of the upstream flange part and downstream flange part that the first drainage orifice extends through, wherein the basin provides fluid communication between the first drainage orifice and the second drainage orifice.

* * * * *